(No Model.)
T. MALCOLMSON.
STEAM ENGINE GOVERNOR.
No. 270,684. Patented Jan. 16, 1883.
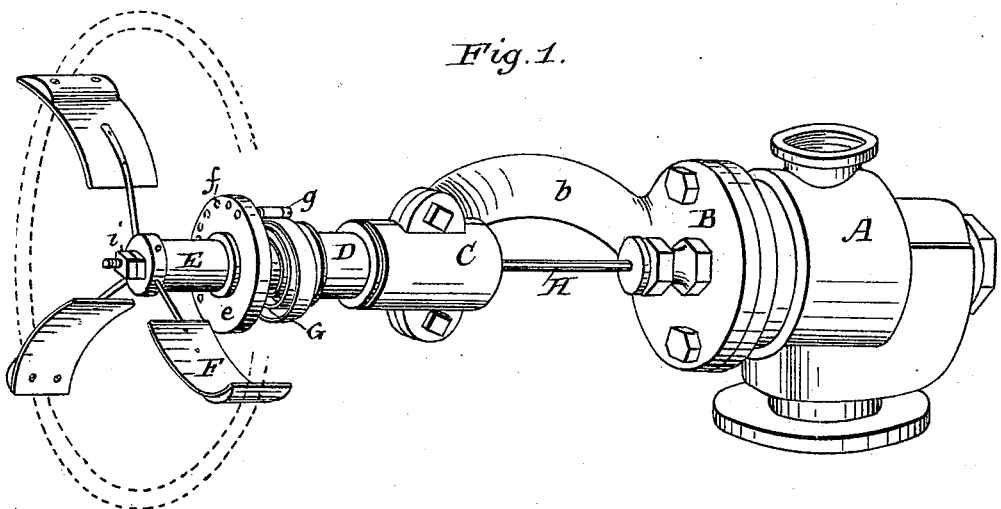
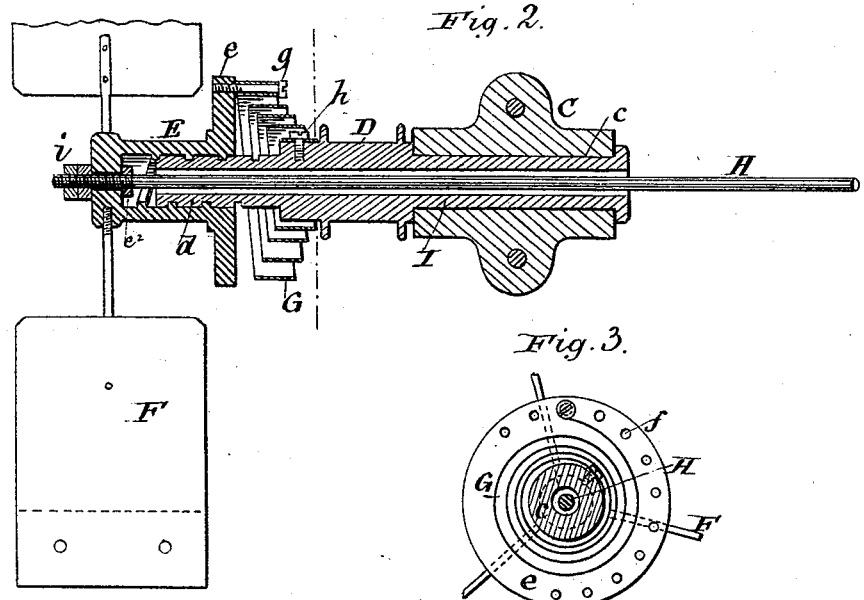
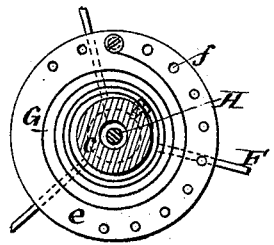
Witnesses:
E. E. Masson
W. B. Masson
Inventor
Thomas Malcolmson
By his attorney
James C. Boyce

UNITED STATES PATENT OFFICE.

THOMAS MALCOLMSON, OF OIL CITY, PENNSYLVANIA, ASSIGNOR OF ONE-HALF TO O. B. GOODWIN, OF SAME PLACE.

STEAM-ENGINE GOVERNOR.

SPECIFICATION forming part of Letters Patent No. 270,684, dated January 16, 1883.

Application filed November 12, 1881. (No model.)

*To all whom it may concern:*

Be it known that I, THOMAS MALCOLMSON, a citizen of the United States, residing at Oil City, in the county of Venango and State of Pennsylvania, have invented certain new and useful Improvements in Steam-Engine Governors, of which the following is a specification, reference being had therein to the accompanying drawings.

My invention relates to steam-engine governors; and the object is to simplify the mechanism employed, make its construction less costly, and render the governor more sensitive in its action.

The invention consists in attaching the valve-rod to the nut, which is interiorly screw-threaded and fitted to a corresponding thread on a spindle attached to the driving-pulley, so that when the nut, turning in the same direction as the spindle, has a more rapid motion than the spindle, said nut will be forced toward the end of the spindle and the valve will be opened, and when the spindle has a more rapid motion than the nut the nut will be wound down the spindle and the valve-rod will be pushed in the direction to close the valve. The nut forms a hub to which vanes are secured, which by their rapid motion against the air secure the necessary resistance and uniformity of motion. The hub is connected to the spindle by a helical spring, and through such spring the motion is communicated from the spindle to the hub.

Figure 1 is a perspective view. Fig. 2 is a longitudinal section of the operating mechanism. Fig. 3 is a detailed view of the adjustable helical spring and flange.

A represents the governor-valve casing, containing a suitable slide-valve, the bonnet or head B of said casing having a curved arm, b, to support a bearing, C, in which the journal end of the hollow spindle I revolves. The spindle I has the flanged pulley D for the reception of the driving-belt, which is operated by a pulley on the engine or some part of the moving machinery. The outer end of the spindle I has the exterior screw-thread d, which fits into a screw-thread on the hub or nut E. Upon this hub E the vanes F are fastened, and are preferably provided with detachable weights on their outer ends, in order that their mechanism may be more uniform. The hub E has on its inner end a flange, e, in which are drilled the holes f. Into one of these holes the screw-bolt g is inserted. The flange is connnected with the spindle I by the helical spring G, one end of said spring being attached to the screw-bolt g. The other end of the spring G is fastened to the spindle I by the screw-bolt h. The valve-rod H passes through the hollow spindle I, and is connected to the hub E and firmly fastened by the lock-nut i and the interior nut, $e^2$; or it may be fastened in any suitable manner.

A suitable cap, C, on the journal-bearing facilitates the ready and convenient removal of the operating mechanism.

Instead of the vanes F, a wheel with weighted rim, as shown by dotted lines in Fig. 1, either with or without flat arms, might be used, if desired.

If the spindle I revolves faster than the hub E, said hub E will be screwed down on the spindle I toward the pulley D, and the valve-rod H will be pushed into the casing A, thus closing the valve and cutting off the steam from the engine; but if the spindle I should revolve slower than the hub E said hub E will be unscrewed from the threaded nut of the spindle I, thus pulling upon the valve-rod H, opening the governor-valve, and emitting more steam to the engine, thus giving higher speed to the rotation of the spindle I until the uniformity between the hub E and the spindle I shall be restored. The spring G not only communicates the motion from the spindle I to the hub E, at no matter what point upon said spindle I the hub may be, but by its resiliency it renders the motion of the hub E back and forth gradual and easy. It is so arranged that the tension of the spring G can be increased or diminished by changing the location of the screw-bolt g in the holes f. The spring G is adjusted according to the required tension for the steam-pressure desired to be used and the rapidity of motion required in the machinery. The spring G is so constructed and attached that its recoil screws the hub E to the end of the spindle I, thereby opening the valve to its widest possible extent. When the engine is at rest the governor-valve is therefore fully opened.

When the throttle-valve is first opened the steam passes freely through the governor-valve and into the engine, thus starting the machinery, the pulley D commences to revolve, and the spindle I is screwed into the hub E, thus starting the governor-valve to close; but almost immediately the motion is communicated through the spring G to the hub E, said spring G is wound up, drawing the hub E down the screw of the spindle I; but when the strength of the spring is overcome the motion of the pulley D is fully communicated to the hub E. When the two motions are uniform the tension of the spring G is partially relaxed, and as it uncoils it not only forces the hub E toward the end of the spindle I, but its uncoiling adds to the rapidity of motion of the hub E, thus forcing it toward the end of the spindle I; but when the motion of the hub E becomes faster than that of the pulley D its travel toward the end of the spindle I opens to the extent of such travel, the governor-valve thus giving quicker motion to the pulley D, and the hub E travels down the spindle and the governor-valve closes to the extent of such travel.

The stiffer the spring G or the greater its tension the quicker the opening of the governor-valve will be. The exact tension required, (within certain limits,) and therefore the requisite speed of machinery, can be secured by changing the screw-bolt $g$ in the holes $f$. The shifting of this governor to open and close the valve is always easy but rapid, and can be made, by the use of a light spring, as gentle and delicate as desired.

I claim as my invention—

1. In a steam-governor, the combination of a valve-rod passing through a hollow screw-threaded spindle, carrying a driving-pulley, a nut provided with arms carrying vanes, and a helical spring secured at one end to the screw-threaded spindle and at the other end to the flange of said nut, substantially as and for the purpose described.

2. In a steam-governor, the combination of a spindle journaled at one end in the frame, and having its opposite end screw-threaded, and carrying a driving-pulley between the two ends, a nut provided with arms carrying vanes, a helical spring secured to said nut and spindle, and a valve-rod passing through the spindle and nut and connected with the latter, substantially as and for the purpose described.

3. In a steam-governor, the combination of the valve-rod H, nut E, vanes F, secured thereto, the hollow spindle I, having journal $c$, adapted to revolve in bearing C, and provided with driving-pulley D, with adjustable helical spring G, permanently secured at one end to the spindle I and adjustably at the other to the flange $e$ of the nut E, substantially as and for the purpose described.

4. The combination of the governor-valve casing A, bearing C, and curved arm $b$, uniting said casing and bearing with a hollow spindle, I, adapted to revolve within said bearing, a nut, E, carrying vanes, a helical spring secured to said spindle and to the nut E, and a valve-rod, H, passing through the spindle I, substantially as and for the purpose described.

5. The combination of the valve-rod H, the nut E, connected therewith, and carrying vanes provided with detachable weights, the hollow spindle I, having a driving-pulley and its end $d$ screw-threaded, with the adjustable helical spring G, secured at one end to the spindle I and at the other to the flange of the nut E, substantially as and for the purpose described.

6. The combination of the valve-rod H and a hollow threaded spindle, upon which a threaded hub slides, with said hub, provided with vanes, and detachable weights attached thereto, substantially as and for the purpose described.

THOMAS MALCOLMSON.

Witnesses:
JAMES C. BOYCE,
O. B. GOODWIN.